United States Patent
Burnett et al.

(10) Patent No.: US 11,687,564 B2
(45) Date of Patent: Jun. 27, 2023

(54) CONTINUOUS REAL-TIME MASKED DATABASE REPLICATION

(71) Applicant: Delphix Corp., Redwood City, CA (US)

(72) Inventors: Nathan C. Burnett, Somerville, MA (US); John Joseph Gallagher, San Francisco, CA (US); Ilker Taskaya, Cary, NC (US)

(73) Assignee: Delphix Corp., Redwood City, CA (US)

( * ) Notice: Subject to any disclaimer, the term of this patent is extended or adjusted under 35 U.S.C. 154(b) by 12 days.

(21) Appl. No.: 17/184,378

(22) Filed: Feb. 24, 2021

(65) Prior Publication Data
US 2022/0269694 A1 Aug. 25, 2022

(51) Int. Cl.
*G06F 16/27* (2019.01)
*G06F 21/62* (2013.01)
*G06F 16/23* (2019.01)

(52) U.S. Cl.
CPC ........ *G06F 16/273* (2019.01); *G06F 16/2358* (2019.01); *G06F 16/2379* (2019.01); *G06F 21/6227* (2013.01)

(58) Field of Classification Search
CPC . G06F 16/273; G06F 16/2379; G06F 16/2358
USPC ........................................................ 707/615
See application file for complete search history.

(56) References Cited

U.S. PATENT DOCUMENTS

| | | | |
|---|---|---|---|
| 7,668,878 B2 | 2/2010 | Arora et al. | |
| 8,522,016 B2 | 8/2013 | Taskaya et al. | |
| 8,533,470 B2 | 9/2013 | Taskaya et al. | |
| 9,054,872 B2 | 6/2015 | Taskaya et al. | |
| 11,451,371 B2* | 9/2022 | Gaddam | .................... H04L 9/14 |
| 2010/0205189 A1* | 8/2010 | Ebrahimi | ................ G06F 21/62 707/804 |
| 2015/0082449 A1* | 3/2015 | Mushkatblat | ....... G06F 21/6254 726/26 |
| 2015/0248422 A1* | 9/2015 | Zha | ........................ G06F 16/128 707/639 |
| 2016/0224797 A1* | 8/2016 | Schrock | .............. G06F 16/2358 |

(Continued)

OTHER PUBLICATIONS

Chu Luo et al., A Data Hiding Approach for Sensitive Smartphone Data, UBICOMP '16, Sep. 12-16, 2016, Heidelberg, Germany, all pages. (Year: 2016).*

(Continued)

*Primary Examiner* — James Trujillo
*Assistant Examiner* — Antonio J Caiado
(74) *Attorney, Agent, or Firm* — Fenwick & West LLP

(57) ABSTRACT

A system performs masking of data stored in a database. The system receives change logs from a source database and masks the change logs to generate masked change logs. The system stores the masked change logs in a pre-buffer. If the system determines that the set of masked change logs stored in the pre-buffer corresponds to a complete transaction, the system determines whether any conflicts exist between masked change logs stored in the pre-buffer and masked change logs stored in a main buffer. If the system identifies conflicts, the system applies the masked change logs stored in the main buffer to a masked replica database. This causes the system to move masked change logs corresponding to a complete transaction from the pre-buffer to the main buffer.

21 Claims, 6 Drawing Sheets

(56) References Cited

U.S. PATENT DOCUMENTS

2019/0325055 A1* 10/2019 Lee ..................... G06F 16/1734
2020/0125667 A1*  4/2020 Sonawane ............. G06F 16/252
2020/0311304 A1* 10/2020 Parthasarathy ..... G06F 11/3006

OTHER PUBLICATIONS

Rahman et al., A Real-Time Privacy-Sensitive Data Hiding Approach Based on Chaos Cryptography, School of Information Technology and Engineering, University of Ottawa, all pages. (Year: 2010).*
Kyle et al., Data Cache Prefetching Using a Global History Buffer, University of Wisconsin, all pages. (Year: 2012).*
Delphix, Delphix Masking Engine User Guide, 2017 Delphix Corp, all pages. (Year: 2017).*
Delphix, Delphix Masking Admin Guide, 2018 Delphix Corp. (Year: 2018).*
Delphix, Delphix Masking Engine User Guide, 2018 Delphix Corp, all pages. (Year: 2018).*
Delphix, Delphix Masking Engine User Guide, 2019, Delphix Corp, all pages. (Year: 2019).*

* cited by examiner

CONTINUOUS REAL-TIME MASKED DATABASE REPLICATION

BACKGROUND

This invention relates generally to masking sensitive data and in particular to real-time data masking.

Software applications used by enterprises often incorporate sensitive data for which access must be carefully controlled. Certain privileged users may be allowed access to the sensitive data. However, several users of systems of an enterprise may not be given access to the sensitive data. These users need to handle representative data for specific purposes. For example, if there is a defect or bug in a program, developers and testers often need to reproduce the conditions under which the defect was caused. This often requires using the original dataset, for example, to reproduce the original conditions. However, the developers and testers are not privileged users and are not allowed to have access to the sensitive data. Enterprises often use data masking to transform or obfuscate the sensitive data such that the original sensitive data cannot be discerned by users.

Many masking systems operate in a batch processing manner. These systems are used to mask an entire dataset in one job, and when that dataset is updated, the entire dataset must be re-masked. The process typically involves making a copy of the source dataset, where the static copy of the data is then masked as a batch. This can take hours, days or in some cases weeks, making it expensive and time consuming to provide consumers of masked datasets with reasonably recent versions of the data.

SUMMARY

Embodiments are directed to systems and methods for masking data in a database system. The system receives change logs from a source database. A change log corresponds to an update made to data of the source database. The system masks the change logs using a predetermined masking algorithm to generate masked change logs. The system stores the masked change logs in a pre-buffer. If the system determines that the set of masked change logs stored in the pre-buffer corresponds to a complete transaction, the system determines whether any conflicts exist between any of the set of masked change logs stored in the pre-buffer and masked change logs stored in a main buffer. If there are conflicts between any of the set of masked change logs stored in the pre-buffer and the masked change logs stored in the main buffer, the system applies the masked change logs stored in the main buffer to the masked replica database and flushes the main buffer. This causes the system to move the set of masked change logs corresponding to a complete transaction from the pre-buffer to the main buffer.

The features and advantages described in this summary and the following detailed description are not all-inclusive. Many additional features and advantages will be apparent to one of ordinary skill in the art in view of the drawings, specification, and claims.

Figure 1:
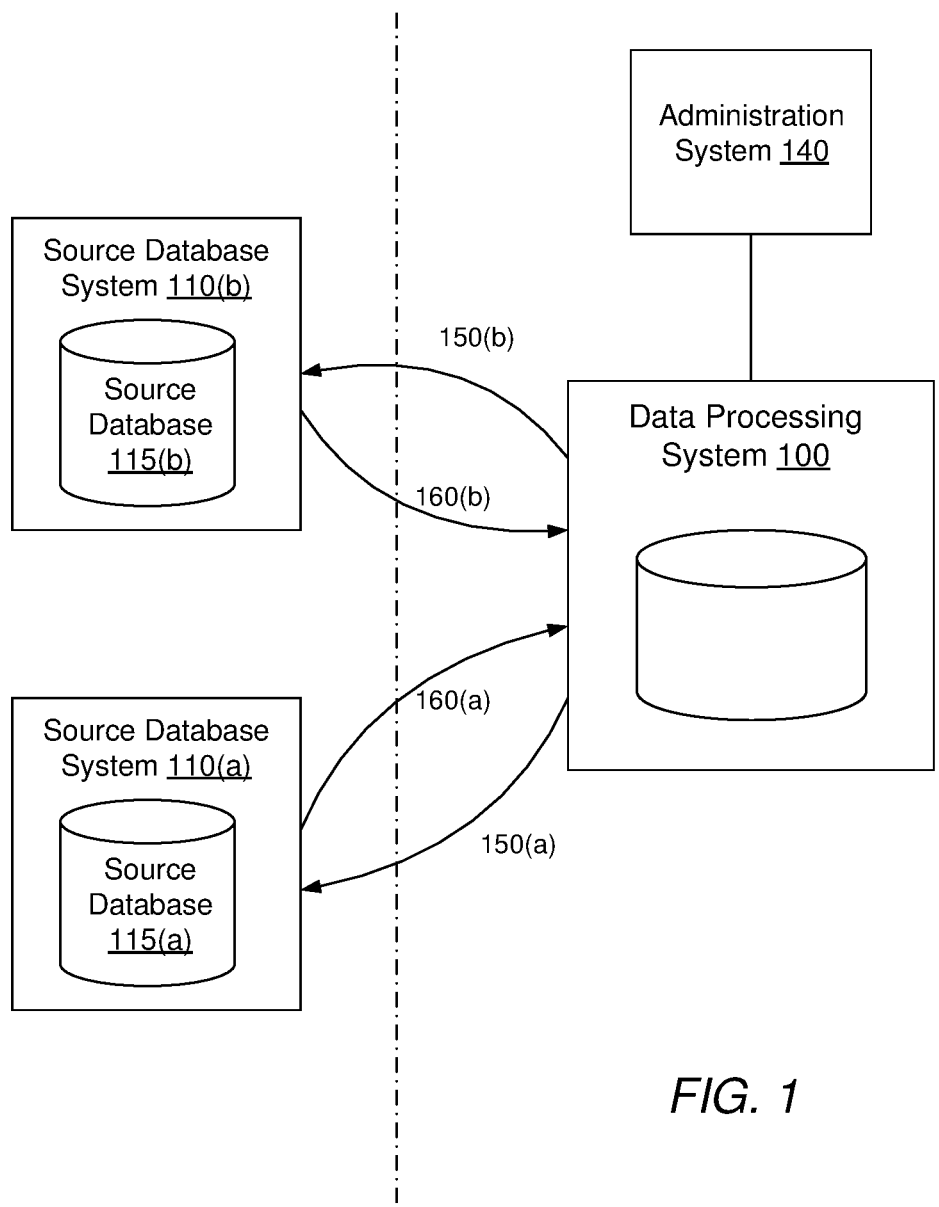
FIG. 1 is a diagram illustrating a data processing system able to performing masking jobs, according to an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A data processing system is configured to access data from one or more source data stores and perform one or more operations on the accessed data. In some embodiments, the data processing system implements one or more engines for performing different types of jobs. For example, the data processing system may implement one or more masking engines for performing masking jobs on the data of one or more data stores. In some embodiments, masking jobs may be divided into profiling jobs, which examine data contained within one or more databases to identify sensitive data (e.g., financial data, personally identifiable information or PII, etc.) that may need to be masked, and masking jobs, which mask the identified sensitive data. In some embodiments, profiling jobs and masking jobs may collectively be referred to as masking jobs.

Masking may be performed on data to obfuscate sensitive data in data stores and files in a consistent manner. Masked copies of the data can be safely distributed to users who do not need access to, for example, personally identifiable customer information, but do need access to other portions of the data (e.g., non-PII portions), and/or a representative version of the data. Since applications that use the masked data may make assumptions about the data (e.g., that a customer has only one name), the data should be masked consistently. For example, if data corresponding to the name "John Doe" is mapped to "Fred Smith" when masking a database associated with a first user, the same mapping should be performed whenever the name "John Doe" appears in other databases of the first user.

Many current masking systems operate in a batch processing manner, in which an entire dataset is masked in one job, and when that dataset is updated, the entire dataset must be re-masked. The process typically involves making a copy of the source dataset, either a 'physical' copy or a virtual copy, to produce a static copy of the data which is then masked as a batch. This can take hours, days or in some cases weeks, making it expensive and time consuming to provide consumers of masked datasets with reasonably recent versions of the data.

Embodiments herein are directed to a masking engine for performing incremental masking of a dataset in substantially real-time. In accordance with some embodiments, a dataset is initially masked in a batch to generate a masked dataset (e.g., using the source data itself, or changed data capture (CDC) data generated based on the source data) in accordance with a selected masking scheme. However, from that point on, as the source data is updated, the masking engine receives CDC data, which collects changes (insertions, deletions and updates) to the source data, masks the CDC data in accordance with the selected masking scheme, and applies the masked version of the changes to the masked dataset. As such, the time consuming process of batch masking only has to be done once, rather than every time a data refresh is desired. The masked dataset can then be copied to provide masked datasets to downstream users, e.g., as one or more virtual databases.

In some embodiments, the masking engine, in order to increase efficiency and reduce a number of network round trips needed between the masking engine and masked dataset, stores masked changes corresponding to a plurality of transactions within a buffer, and applies the changes to the masked dataset together, instead of separately for each transaction. In some embodiments, to maintain the order at which changes occurred at the source database, the masking engine checks the masked changes prior to storing them in the buffer, to prevent conflicts between different stored changes. In addition, the masking engine may apply the changes stored in the buffer to the masked dataset periodically, or after a threshold number of changes has been reached, so that the masked dataset is updated in substantially real-time, and users of the masked dataset (e.g., users of a virtual database generated from the masked dataset) are provided a reasonably recent masked version of the data of the source database.

System Overview

FIG. 1 is diagram illustrating a data processing system able to performing masking jobs, according to an embodiment of the invention. One or more source database systems 110 manage data for an organization. The data processing system 100 is able to access data of source databases 115 stored in the one or more source database systems 110. In some embodiments, the data processing system 100 retrieves the source data from the source databases 115 and stores the data in an efficient manner for use in performing various jobs (e.g., masking jobs). A database administrator user interface allows a database administrator to perform various actions supported by the data processing system 100, such as initiating various jobs on the stored data within the source database systems 110.

In response to a request from the administration system 140, or based on a predefined schedule, or some combination thereof, the data processing system 100 sends a request 150 for data to a source database system 110. The source database system 110 responds by sending information stored in the source database as a stream of data 160.

The stored data may be used for various functions, such as creating virtual databases, analysis by one or more users, performing masking jobs, and/or the like. In some embodiments, the data stored and manipulated by the data processing system 100 may be viewed by one or more users through a file sharing system.

In an embodiment, the data processing system 100 stores received and processed data in one or more data stores. A data store may be an unsecure data store or a secure data store. An unsecure data store may store unmasked sensitive data, which corresponds to sensitive data in its original format as obtained from the source database. The data processing system may require a user to have certain privileges to access sensitive data of unsecure data stores. A secure data store may store sensitive data in masked format. The data processing system may allow access to data associated with secure data stores to users with lower privileges compared to users allowed to access unsecure data stores. In an embodiment, the data processing system creates a secure data store corresponding to an unsecure data store by processing and masking the data within the unsecure data store.

Figure 2:
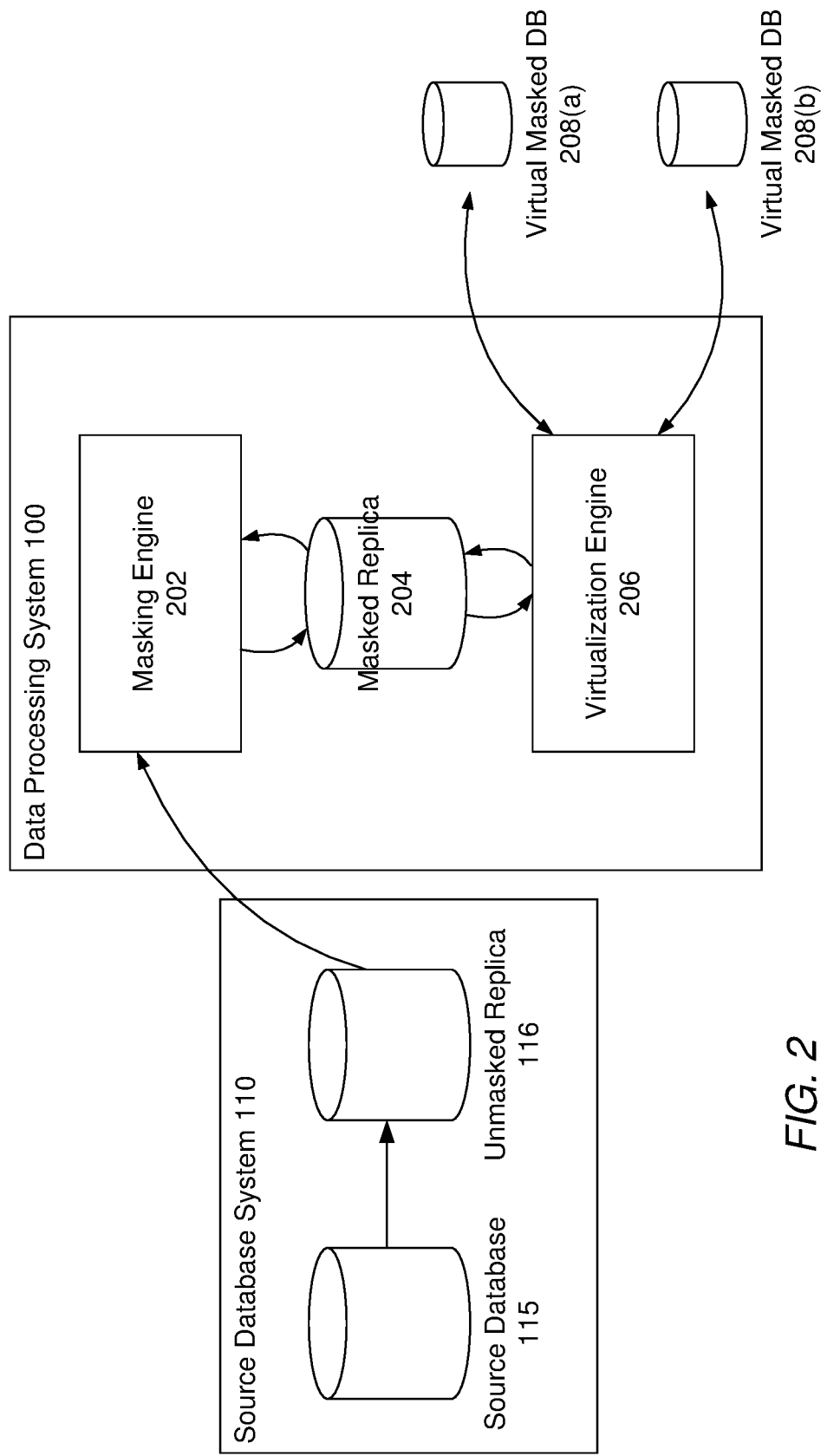
FIG. 2 is a diagram illustrating the data processing system used for performing masking, according to an embodiment of the invention.

FIG. 2 is diagram illustrating the data processing system used for performing masking, according to an embodiment of the invention. The data processing system 100 illustrated in FIG. 2 includes at least a masking engine 202 and a virtualization engine 206. The masking engine 202 is configured to receive data associated with a source database 115 and generate masked data to be applied to a masked replica 204 of the source database 115. The virtualization engine 206 may ingest the masked replica 204 to provision one or more masked virtual databases (VDBs) 208 (e.g., VDBs 208(a) and 208(b)), allowing for multiple different users to access the data of the masked replica 204.

The source database system 110 may correspond to the source database system 110(a) or 110(b) illustrated in FIG. 1, while the source database 115 may correspond to the source database 115(a) or 115(b). In some embodiments, the data processing system 100 does not access the source database 115 directly. For example, in some embodiments, the source database 115 corresponds to a production database, and an administrator of the source database system 110 may disallow other systems such as the data processing system 100 from accessing the source database 115 directly. Instead, the source database system 110 may contain a unmasked replica database 116 corresponding to a copy of the source database 115 that is accessible to the data processing system 100. In some embodiments, the unmasked replica database 116 is generated using change logs or transaction logs associated with updates to the source database 115. In other embodiments, the data processing system 100 accesses the source database 115 directly, instead of the unmasked replica database 116.

The source database system 110 may correspond to an Oracle server, Microsoft SQL Server, IBM Db2, etc., or other type of server that that supports Change Data Capture (CDC). The masking engine 202 receives CDC data (hereinafter also referred to as change logs or change events) from the source database system 110 (e.g., from the unmasked replica database 116), which indicates changes made to the data of the source database 115. For example, the change logs provides a record of changes (e.g., update, insert, delete) to a database table or tables of the source database 115, and may correspond to individual events for every change to the given set of tables. In some embodiments, the CDC data is processed using a platform such as Debezium or Streamsets.

In some embodiments, each change log of the CDC data contains at least the following information: the operation represented by the change log (e.g., update, insert, delete), the data as it existed before the operation was applied, the data after the operation was applied, a sequence number representing the order in which operations occurred on the source (e.g., the log sequence number for an SQL Server), and a commit number representing when the change was committed. For example, in some embodiments, a given transaction on the source database may correspond to multiple change logs corresponding to multiple operations, where each change log has a sequence number indicating an order of the operations within the transaction, and a commit number shared by all operations within the transaction.

The masking engine 202 uses the received stream of change logs from the production source database system 110 to replicate the data of the source database 115 to a staging instance, masking the data in the events along the way to generate the masked replica 204. The virtualization engine 206 may then, treating the masked replica 204 as a source, provision secure virtual databases that may be accessed by various users. The masking engine 202 updates the masked replica 204 as additional change logs from the source data system 110 are received, keeping the masked data of the masked replica 204 up-to-date with the data of the source database 115, without needing to re-mask the data of the source database 115 from scratch. As the masked replica 204 is updated continuously in substantially real-time, users are able to, via the virtual databases 208, access up-to-date masked data.

Masking Engine

Figure 3:
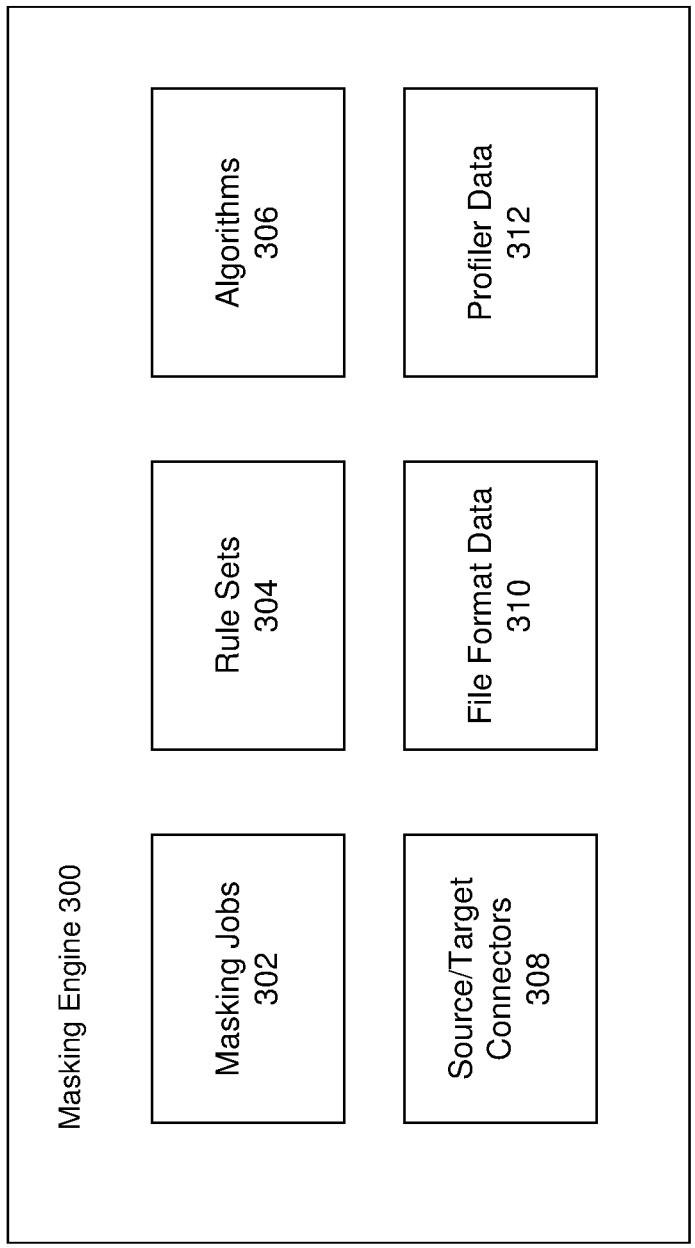
FIG. 3 illustrates components of a masking engine, in accordance with some embodiments.

FIG. 3 illustrates components of a masking engine, in accordance with some embodiments. The masking engine 300 of FIG. 3 may correspond to the masking engine 202 illustrated in FIG. 2. The masking engine 300 maintains one or more different types of objects, which may include job objects 302, rule sets 304, algorithms 306, source/target connectors 308, file format data 310, profiler data 312, and/or the like. In other embodiments, the masking engine 300 may maintain more or fewer types of objects than those illustrated in FIG. 3.

The masking job object 302 may correspond to a particular masking job to be performed by the masking engine 300. In some embodiments, the masking job object 302 may correspond to a profiling job (for examining data and identifying a subset of the data as sensitive data that should be masked), a masking job (for masking the sensitive data identified by a profiling job), or both. In some embodiments, the masking job object 302 indicates a corpus of data to be examined and masked (e.g., data stored in one or more files, database tables, etc.), at least one source database that the data is stored on, a type of masking to be performed, and/or the like. The masking job object further indicates one or more dependent objects that will be used by the masking engine 300 when performing the masking job, such as a rule set, one or more algorithms, one or more connectors, etc. In some embodiments, certain data associated with the masking job (e.g., an indication of the corpus of data to be examined and masked) is not indicated in the masking job object 302 itself, but may be indicated by a different object upon which the masking job object 302 depends (e.g., by a connector object 308 that the masking job object 302 depends upon).

The rule set object 304 may comprise data indicating a structure of the data to be masked by a masking job (e.g., as indicated by the masking job object). For example, the rule set may indicate a database schema used by the data, how fields in the scheme map to masking algorithms, and/or the like.

The masking scheme object 306 may correspond to one or more masking schemes to be used in masking. A masking scheme comprises a set of instructions that are stored in a computer readable memory and can be executed by a processor. Example types of masking schemes may include lookup schemes (e.g., binary lookup), segmenting schemes, tokenization schemes, mapping schemes, and/or the like. In some embodiments, multiple masking schemes (corresponding to multiple masking scheme objects) may be used to mask data of a particular field. For example, data of a particular field may be first segmented using a segmenting scheme, whereupon the segments are mapped to masked data using a mapping scheme. In some embodiments, the masking scheme object 306 is associated with one or more data structures (e.g., a lookup structure for performing lookup and/or mapping). For example, the lookup structure may comprise a file containing a list of possible output values to use when masking. Examples of lookup masking schemes that may be used are described in U.S. Pat. No. 9,054,872, while examples of segmenting masking schemes are described in U.S. Pat. No. 8,533,470, both of which are hereby incorporated by reference in their entireties.

In addition, the masking scheme object may be associated with a key or salt corresponding to a random or pseudo-random sequence, allowing for the masking scheme to produce unique results in comparison to other instances of the masking scheme of the same type. For example, a masking scheme for masking names may replace "John Doe" with "Fred Smith" when a first key value is used. On the other hand, if a second, different key value is used, the same masking scheme may map "John Doe" to a different value, such as "William Brown." As such, when synchronizing a masking job across different masking engines, it may be important to ensure that the masking scheme object is synchronized such that each masking engine will use the same key for the masking scheme, ensuring consistent masked values regardless of which engine is the one that masked the data.

As used herein, a masking scheme object may correspond to a particular instance of a masking scheme. For example, the masking engine may have multiple masking scheme objects corresponding to the same type of masking scheme, where each masking scheme object may be associated with a different state (e.g., lookup files, key/salt).

Many masking schemes can be used for many different masking jobs, regardless of the actual data being masked. For example, in some embodiments, the masking scheme object 306 may comprise a reference to a global masking scheme object, instead of containing data for the actual masking scheme. Each global object can be referenced by multiple masking jobs (directly or indirectly) maintained by the masking engine. For example, one or more global objects may be maintained as part of a shared pool accessible by multiple different masking job engines. A masking job object on a first masking engine may refer to one or more global masking scheme objects by references, and the actual masking scheme objects may be downloaded onto the masking job engine only when the masking job is run.

The source/target connector object 308 comprise information indicating how to access the source database to retrieve the data to be masked. In some embodiments, the connector object 308 may include one or more Java Database Connectivity (JDBC) parameters, SSH File Transfer Protocol (SFTP) credentials, authentication information, etc., corresponding to the source database that the data to be masked is stored on.

The file format data 310 comprises data indicating how the data to be masked is formatted. For example, the file format data 310 may indicate a list of fields corresponding to columns of a CSV file or an XML schema. For example, a rule set may depend upon the file format data 310 to determine fields corresponding to data to be masked, and map each field to one or more masking scheme objects 306.

The profiler data object 312 may comprise data used to detect sensitive data within the retrieved data to be masked. For example, in some embodiments the profiler data object contains one or more regular expressions corresponding to types of sensitive data.

Figure 4:
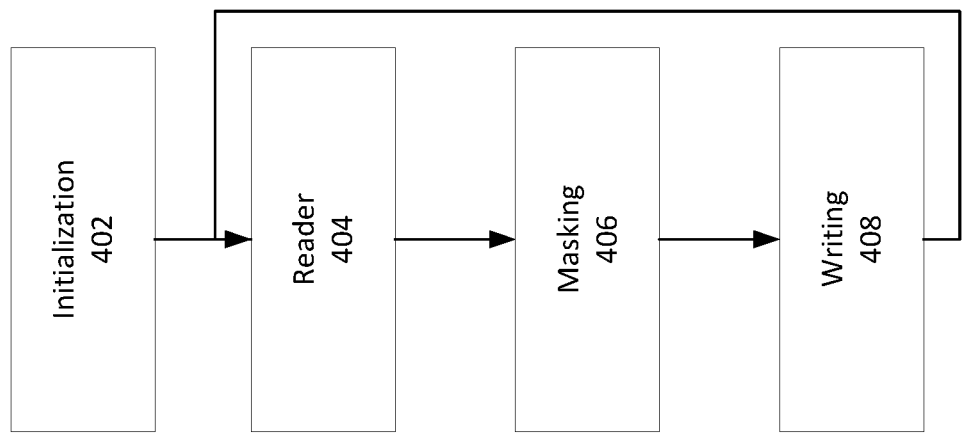
FIG. 4 is a diagram of masking pipeline operations performed by the masking engine to maintain the masked replica database, in accordance with some embodiments.

FIG. 4 is a diagram of masking pipeline operations performed by the masking engine to maintain the masked replica database, in accordance with some embodiments. In some embodiments, the masking engine first initializes 402 the masked replica database, and maintains the masked replica database by performing a reading step 404, a masking step 406, and a writing step 408.

Prior to being able to use change data to incrementally update a masked replica, the masking engine first creates the masked replica database. In some embodiments, the masking engine, in the initialization step 402, replicates the entire source database by reading the data of the source database from a consistent point in time (e.g., from the unmasked replica 116) and masking it to produce the initial masked replica. In some embodiments, this process may be similar to running an on-the-fly masking job, such as that described in U.S. Pat. No. 8,522,016, which is hereby incorporated by reference in its entirety.

In some embodiments, the initial masked replica is generated based on a transactionally consistent point in time of the source database, e.g., based on a copy of the source database that does not change during the masking process. In some embodiments, the masking engine further collects change data corresponding to changes to the source database after the time the start of the copying and masking, so that all of the changes that occur to source database while copying and masking are being performed can be subsequently masked and replayed against the new masked database.

In some embodiments, the initial masked replica is produced based upon generated pseudo change events representing the initial data in the database from a transactionally consistent view of the data, in which the pseudo change events are processed in a manner similar to processing CDC change logs (discussed in greater detail below) to produce and mask the initial data of the database. In some embodiments, because the masked replica database is to updated in real time or near real time, this architecture may copy all data from the source database, whether that data is to be masked or not.

In some embodiments, the initial masked replica is generated based on a unmasked virtual database (e.g., provisioned by the virtualization engine) using the source database as a source. In some embodiments, because UPDATE statements typically take longer to execute than INSERT statements, the masking engine generates the initial masked replica by disabling constraints on the tables to be masked, truncating any unmasked data from the table of the target database, and then writing the masked data to the target database table using purely INSERT statements. For example, in some embodiments, because the original transaction structure that generated the initial data may be unknown, it may be difficult to generate the initial copy of the data while satisfying foreign key constraints. As such, foreign key constraints may be disabled during the initial copying phase, and reenabled when later replicating change logs to update the masked database, as the transaction structure will be available during that time. In some embodiments, the initialization step 402 used to generate the initial masked replica is performed once. However, in some cases, the batched masking tool that is used to create the initial copy will also have to be used when an inventory is modified (e.g., to add masking to a previously unmasked column, or to change a masking scheme applied to a column).

In the reading step 404, the masking engine receives change logs (e.g., CDC data) from the source database system 110. In some embodiments, the masking engine operates as a pull model that reads the change logs from the source database system (e.g., from the unmasked replica 116), while in other embodiments, the masking engine operates as a push model that accepts change logs sent by the source database system 110. In some embodiments, as the masking engine receives the change logs, it marshals the received data into a standard object type (e.g., a standard Java object type) that is understood by the rest of the pipeline. The marshalling may allow for remaining portions of the masking pipeline to be platform agnostic.

In some embodiments, change logs/updates are provided on a per-table basis. As such, the masking engine may, during the reading step, analyze the transaction metadata associated with the various change logs to ensure that the updates are fed to the rest of the pipeline in the correct order and that COMMIT events are issued at the appropriate time to maintain the transactional consistency of the target masked replica database. For example, in some embodiments, change logs of a particular transaction are applied in their original order, but can be interleaved with change logs from other transactions that are not updating the same data. In other embodiments, change logs within a particular transaction can be applied in any order.

In the masking step 406, the masking engine implements a selected masking policy on the received change logs (e.g., in accordance with rule sets 304 and/or masking scheme objects 306 associated with the particular masking job 302). In some embodiments, the masking engine maintains a mapping from columns in the source database to masking schemes. When a change log arrives, the masking engine looks up the columns present in the event and applies the appropriate masking scheme, if any, before sending the masked version of the change log further down the pipeline.

As discussed above, each change log may comprise data indicating the type of operation represented, the data as it existed before the operation was applied ("before value"), the data after the operation was applied ("after value"), and sequence numbers relating to the event. In some embodiments, the masking engine, during the masking step, masks the values of the data after the operation was applied to be applied to the masked replica. In some embodiments, when masking data corresponding to a primary key, the masking engine masks the before value of the primary key in order to look up the data within the masked replica to be updated in accordance with the change log.

In the writing step 408, the masking engine writes the masked data (e.g., masked change logs) to the target masked replica database. In some embodiments, the masking engine performs the writing using JDBC. In some embodiments, when an update event arrives at the masking engine and is masked, the masking engine creates a SQL statement representing the masked update and sends it to the target masked replica database, but does not commit the transaction until a COMMIT event arrives from upstream. In some embodiments, the masking engine also performs some platform specific operations such as temporarily enabling updates to an IDENTITY column in an SQL Server when necessary.

In some embodiments, the masking engine is configured to write masked data (e.g., masked change logs) to the masked replica in batches, in order to ensure that each commit at the masked replica corresponds to a commit point on the production database. For example, in some embodiments, the masking engine stores masked data corresponding to received change logs in a buffer memory, and writes the masked data to the masked replica only when the masked data for all change logs of a committed transaction are received.

In some embodiments, the masking engine performs a persistence step (not shown) before or after the masking step. Persisting the change data would allow the events corresponding to the change data to be replayed later, rather than solely in real time. The persisted data is used to implement point-in-time provisioning, replay of workloads for testing, and/or replay events with different masking rules. In some embodiments, performing the persistence step prior to masking allows masking rules to be changed and the changes replayed, while performing the persistence step after masking may allow for the events to be replayed without the overhead of re-masking.

Scheduling/Buffering

Figure 5:
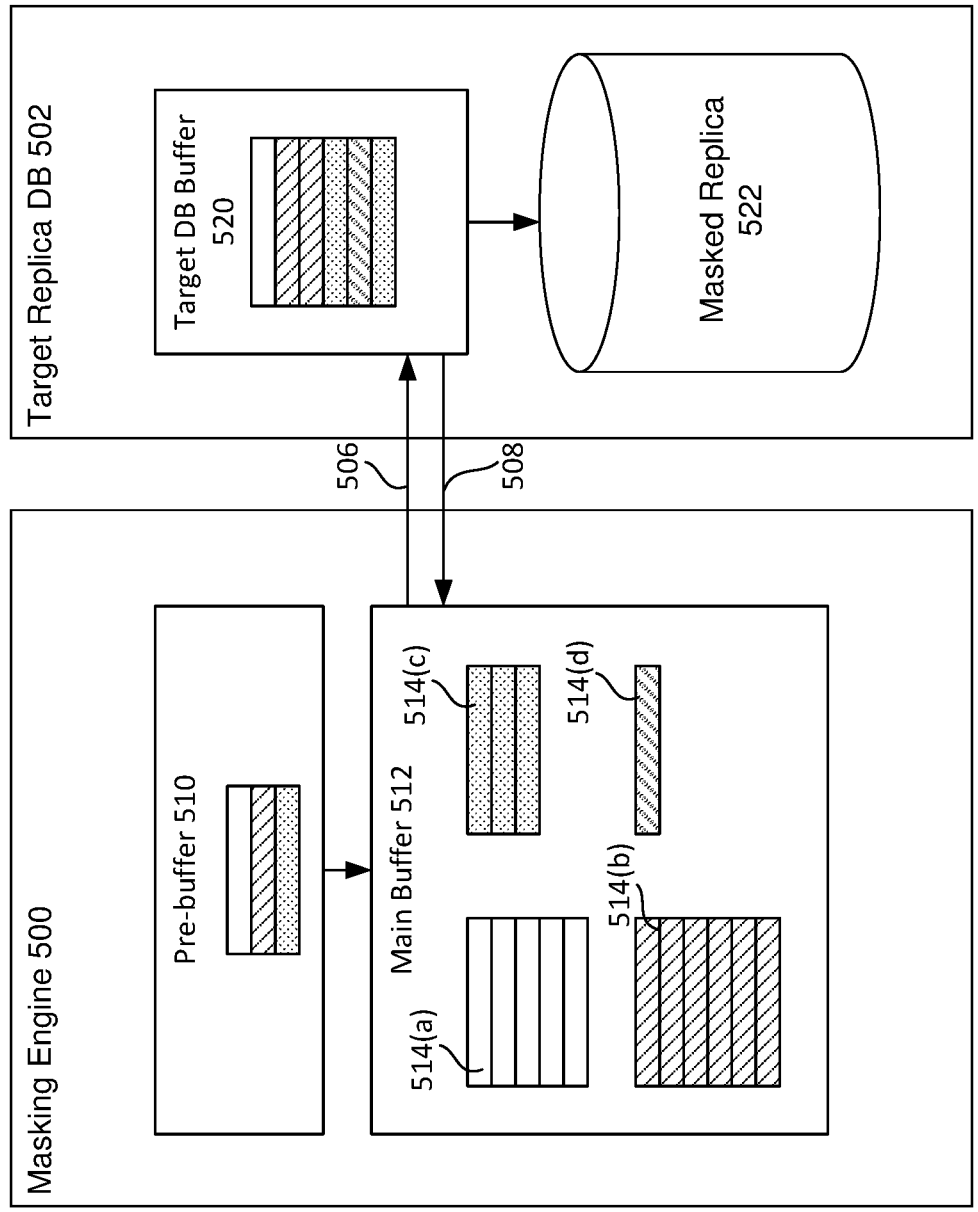
FIG. 5 is a high level diagram show how the masking engine schedules updates to the target masked replica database, in accordance with some embodiments.

FIG. 5 is a high level diagram show how the masking engine schedules updates to the target masked replica database, in accordance with some embodiments. The masking engine 500 illustrated in FIG. 5 may correspond to the masking engine 202 of FIG. 2, or the masking engine 300 of FIG. 3. The masked replica 522 may correspond to the masked replica 204 of FIG. 2.

As discussed above, the masking engine may be configured to receive a stream of change logs from the source database system, mask the data of the received change logs, and apply the changes to the target masked replica, to maintain a masked replica of the source database in substantially real-time. The masking engine may be configured to balance frequency of updates (to maintain real-time performance) with performance efficiency by batch processing change log updates.

In some embodiments, the masking engine 500 is configured to process all change logs received from a source database system corresponding to a particular source database. For example, a source database may have many client instances writing to it. However, the masking engine 500 may not be able to determine which updates of the received change log data were generated on the same client and which came from different clients (except that updates that are part of the same transaction come from the same client). On the other hand, processing change logs corresponding to updates generated by different clients at the same masking engine may facilitate preservation of the order of operations. For example, two applications updating the source database may update the same row. The second application may even read the data written by the first application to determine what its own update should be. As the masking engine 500 handles all change logs associated with the source database, the masking engine 500 may be configured to guarantee that the second update comes second. In other words, they are not reordered.

In some embodiments, the masking engine 500 is configured provide batches of masked change logs to the target replica database 502 often enough to keep batch sizes reasonable (from the perspective of the database being written to) and often enough to provide end users with sufficiently frequent updates and points in time from which they can provision, but with less frequency in comparison to the production applications to allow for batches of multiple transactions to be committed at once to reduce a number of network round trips between the masking engine 500 and the target replica database 502.

In some embodiments, the masking engine 500 schedules updates to the target replica database 502 to correspond to transactional points in time, such that each commit corresponds to a commit on the source database. However, for efficiency reasons, the masking engine 500 may batch updates corresponding to multiple transactions, so that not every commit point on the production database is reproduced at the masked replica 522. For example, in some embodiments, a network round trip is performed for each update sent from the masking engine 500 to the target replica database 502, where the masking engine 500 transmits to the target replica database 502 a batch 506 of one or more masked changed updated to be applied to the masked replica 522, and receives a response 508 indicating whether the masked updates were successfully committed. By batching masked change logs to be applied to the masked replica 522, a larger amount of data is committed per round trip, and a number of round trips and commits is reduced, increasing performance efficiency. In some embodiments, the target replica database 502 receives the batch 506 of masked change events at a target database buffer 520 to be applied and committed to the masked replica 522. In some embodiments, in cases involving a large batch of masked change logs, a portion of the batch may be transmitted from the main buffer 512 to the target database buffer 520 without a commit, where the commit is sent at the end of the batch.

In addition, the masking engine 500 is configured to preserve the order of transactions applied to the same data of the masked replica 522. For example, if a first transaction updates a value of a particular row, and a second transaction deletes the row, the masking engine 500 should ensure that the transactions are applied in the correct order. To do so, the masking engine 500 implements a pre-buffer 510 and buffer 512 for batching masked change logs to be applied to the target replica database 502 and maintain transaction order. In some embodiments, the pre-buffer 512 and the buffer 514 may be implemented as separate memory devices, or as separate sections of the same memory device.

The buffer 512 of the masking engine 500 stores masked change logs prior to transmission to the target replica database 502. In some embodiments, the buffer 512 groups the stored masked change logs by type of event (e.g., update insert, and/or delete). For example, FIG. 5 shows the buffer 512 storing multiple masked change logs 514, where change logs of each type are grouped together (e.g., as groups 514(*a*), 514(*b*), 514(*c*), 514(*d*)). In some embodiments, events may be batched together if they have the same structure. For example, UPDATE TABLE foo SET x=5 WHERE y=10 and UPDATE TABLE foo SET x=25 WHERE y=101 can be batched together due to being the same event type with the same structure, differing only in parameter values, while UPDATE TABLE foo SET z=12, WHERE w=50 AND x=12 would be part of a different batch due to having a different structure.

The masking engine 500, at certain intervals, flushes the masked change logs stored in the buffer 512 to the target replica database 502 to be applied and committed. In some embodiments, the masking engine 500 flushes the buffer 512 when all change logs of one or more transactions are stored in the buffer 512, so that each transmitted batch 506 of masked change logs represent committable points.

In some embodiments, the masking engine 500 determines whether all change logs for a given transaction have been received based on the metadata of the received change logs. In some embodiments, each received change log contains metadata including a sequence number (e.g., indicating an order of operations within a transaction), and an identifier of a transaction that the change log is associated with (TxId). Because the received change logs do not skip transactions, the masking engine 500 may determine that all change logs for a transaction have been received when the masking system 500 receives a change log associated with a next transaction identifier. In some embodiments, the change logs received from the source database system may include explicit commit events indicating the end of a transaction.

In some embodiments, the masking engine 500 includes a pre-buffer 510 for storing masked change logs prior to being stored in the buffer 512. As the masking engine 500 generates masked versions of change logs received from the source database system, the masked change logs are stored in the pre-buffer 510 until all change logs for a given transaction are received. Once the pre-buffer 510 contains masked change logs corresponding to a complete transaction, the stored masked change logs may be moved into the main buffer 512.

The masking engine 500 utilizes the pre-buffer 510 in conjunction with the main buffer 512 to ensure that the main buffer 512 only stores masked change logs corresponding to a whole number of transactions, and to maintain an order of events applied to the same data of the target replica database 502. To do so, the masking engine 500, prior to moving the masked change logs of a transaction from the pre-buffer 510 to the main buffer 512, checks whether a conflict exists between the transaction and a masked change log currently stored in the main buffer 512. In some embodiments, the masking engine 500 identifies a conflict is if any masked change log of the transaction stored in the pre-buffer 510 operates on the same piece of data as a masked change log stored in the main buffer 512.

In some embodiments, the masking engine 500 checks for conflicts using an additional data structure that tracks which pieces of data of the masked replica there are pending changes on. For example, the additional data structure may be implemented as a HashSet that tracks which (table, row) pairs are associated with masked change logs stored in the main buffer. In some embodiments, a row is uniquely identified by its primary key or other unique index. In cases where a table does not have any unique indexes, it may be identified by all of its values. By maintaining the additional data structure, the masking engine 500 is able to check for conflicts between the masked change logs of the pre-buffer and main buffer without needing to examine the masked change logs stored in the main buffer.

If a conflict exists, the masking engine 500 flushes the contents of the main buffer 512 to the target replica database 502 (e.g., transmits the masked change logs stored in the main buffer 512 as a batch 506 to be applied and committed to the target replica database 502) before moving the contents of the pre-buffer 510 to the main buffer 512. In addition, the masking engine 500 may flush the masked change logs of the main buffer 512 to the target replica database 502 responsive to the main buffer 512 containing a threshold number of masked change logs, masked change logs corresponding to a threshold number of transactions, after a threshold period of time as elapsed, or any combination thereof.

As such, by maintaining a pre-buffer of masked change logs until all change logs for a particular transaction are collected, and moving the change logs for the transaction to the main buffer only if no conflict is detected between the change logs of the transaction and any change logs stored in the main buffer, the masking engine 500 is able to ensure that masked change logs sent to the target replica database 502 are batched as a whole number of complete transactions, and that change logs that operate on the same data are committed in order in the same order as which occurred on the source database.

In some embodiments, the masking engine 500 may send masked change logs 514 to the target replica database 502 without issuing a commit. For example, the target replica database 502 may store the batch of masked change logs in the target database buffer 520 without committing them to the masked replica 522. In some embodiments, if a new masked change log (e.g., stored in the pre-buffer 510) conflicts with a masked change log that has been transmitted to the target replica database 502 but not yet committed, the masking engine 500 may issue a commit command to the target replica database 502, without flushing the main buffer 512.

Process Flow

Figure 6:
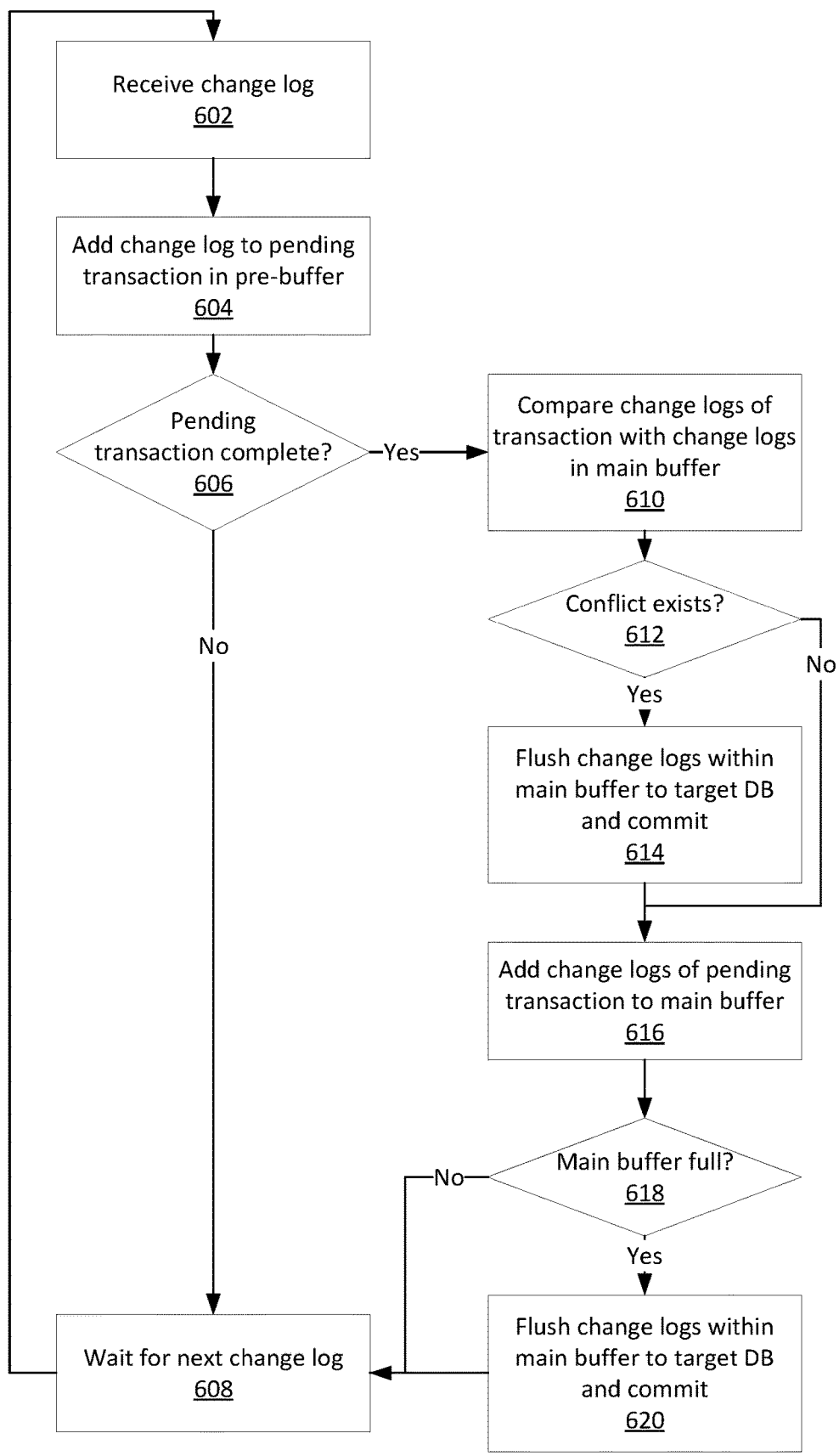
FIG. 6 is a flowchart of a process for managing updates of a masked replica database, in accordance with some embodiments.

FIG. 6 is a flowchart of a process for managing updates of a masked replica database, in accordance with some embodiments. The process illustrated in FIG. 6 may be performed by a masking engine having a pre-buffer and a main buffer, such as that illustrated in FIG. 5, where the masking engine uses the pre-buffer and main buffer to manage how batches of masked change logs are sent to the masked replica database to be applied and committed.

The masking engine receives 602 a new change log from the source database system. As discussed above, the change log may be received in the form of CDC data. The masking engine may read in the new change log (e.g., as described above in relation to FIG. 4) and mask the received change log to generate a masked change log. In some embodiments, the masking engine converts the change log to a JDBC statement as part of the masking to generate the masked change log.

The masking engine adds 604 the masked change log to a pending transaction stored in a pre-buffer. In some embodiments, the pre-buffer is configured to store masked change logs corresponding to a particular transaction until all change logs of the transaction have been received and masked. By doing so, the masking engine can ensure that the main buffer only stores change logs for a complete number of transactions.

The masking engine determines 606 whether the pending transaction stored in the pre-buffer is complete. In some embodiments, the masking engine determines that the pending transaction stored in the pre-buffer is complete when it receives a new change log having a different transaction ID compared to those of the masked change logs already stored in the pre-buffer. In other embodiments, the masking engine determines that the pending transaction is complete responsive to receiving an explicit commit event. If the masking engine determines that the pending transaction stored in the pre-buffer is not yet complete, the masking engine waits 608 for the receipt of a next change log, and the process repeats.

On the other hand if the masking engine determines that the pending transaction stored in the pre-buffer is complete, the masking engine compares 610 the change logs of the pending transaction in the pre-buffer to those of masked change logs stored in the main buffer, to determine 612 whether any conflicts exist. In some embodiments, a conflict exists when a masked change log in the pre-buffer operates on the same data as a masked change log stored in the main buffer (e.g., both change logs operate on the same row of data).

If the masking engine determines 612 that a conflict exists, then the masking engine flushes 614 the masked change logs currently stored in the main buffer to the target masked replica to be applied and committed to the target masked replica. The masking engine then adds 616 the masked change logs from the pre-buffer to the main buffer. On the other hand, if no conflict exists, the masking engine may add 616 the masked change logs from the pre-buffer to the main buffer without first flushing the main buffer.

The masking engine determines 618 whether the main buffer is full. In some embodiments, the main buffer is determined to be full if it contains at least a threshold number of masked change log, masked change logs corresponding to at least a threshold number of transactions, or some combination thereof. In some embodiments, the masking engine may also consider the main buffer to be full if a threshold amount of time as passed since a previous flush of the main buffer to the target masked replica.

If the masking engine determines that the main buffer is not yet full, then the masking engine waits 608 for a next change log, and the process repeats. On the other hand, if the masking engine determines the main buffer to be full, then the masking engine flushes 620 the masked change logs stored in the main buffer to be applied and committed to the target masked replica, before waiting for a next change log.

While FIG. 6 illustrates the masking engine performing various operations, it is understood that in other embodiments, the masking engine may perform additional or fewer steps, and/or in a different order. For example, in some embodiments, the masking engine may not determine whether the main buffer is full if it had previously flushed the masked change logs of the main buffer responsive to a determination that a conflict exists between masked change logs of the pre-buffer and main buffer.

By storing masked change logs using a buffer and batching multiple masked changed events to be sent to the target masked replica in a single round trip (e.g., by flushing the change logs of the main buffer), the masking engine is able to reduce a number of round trips communications with the masked replica database, while still updating the masked replica database frequently enough such that users of the masked replica database will be able to access up-to-date masked data corresponding to the source database. In addition, the masking engine uses the pre-buffer in conjunction with the main buffer to ensure that each batch contains a whole number of transactions (as main buffer only stores masked change logs corresponding to whole transactions), and that none of change logs of a particular batch will conflict with each other. The masking engine thus ensures that change logs that apply to the same data will be applied at the masked replica database in the same order as on the source database.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one. The singular also includes the plural unless stated otherwise.

Upon reading this disclosure, those of skill in the art will appreciate still additional alternative structural and functional designs for a system and a process for performing continuous real-time data replication and masking. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for maintaining a masked replica database of a source database, comprising:
  receiving one or more change logs, each corresponding to a respective update event made to data of the source database;
  masking the one or more change logs using a predetermined masking algorithm to generate a set of masked change logs;
  storing the set of masked change logs in a pre-buffer;
  responsive to a determination that the set of masked change logs stored in the pre-buffer corresponds to a complete transaction:
    determining whether any conflicts exist between any of the set of masked change logs stored in the pre-buffer and one or more masked change logs stored in a main buffer, wherein a conflict exists when a change log of the set of masked change logs and a change log of the one or more masked change logs stored in the main buffer are configured to operate on the same data of the masked replica database;
    responsive to determining that a conflict exists between any of the set of masked change logs stored in the pre-buffer and the one or more masked change logs stored in the main buffer, applying the one or more masked change logs stored in the main buffer to the masked replica database to update the masked replica database, and flushing the main buffer;

moving the set of masked change logs corresponding to a complete transaction from the pre-buffer to the main buffer.

2. The method of claim 1, further comprising applying the one or more masked change logs stored in the main buffer to the masked replica database and flushing the main buffer responsive to a determination that the main buffer is storing at least a threshold number of masked change logs.

3. The method of claim 1, wherein applying the one or more masked change logs stored in the main buffer to the masked replica database and flushing the main buffer comprises:

transmitting the one or more masked change logs from the main buffer to the masked replica database; and receiving a response from the masked replica database indicating whether the one or more masked change logs were successfully applied.

4. The method of claim 1, wherein the one or more change logs comprise changed data capture (CDC) data.

5. The method of claim 1, wherein each change log comprises a sequence number indicating a transaction that the change log is a part of, and further comprising determining that the set of masked change logs stored in pre-buffer corresponds to a complete transaction responsive to receiving a new change log having a different sequence number in comparison to the set of the masked change logs stored in the pre-buffer.

6. The method of claim 1, further comprising determining that the set of masked change logs stored in pre-buffer corresponds to a complete transaction responsive to receiving a new change log explicitly indicating a transaction commit event.

7. The method of claim 1, wherein the one or more change logs each correspond to one of an update, an insert, or a delete.

8. The method of claim 1, further comprising provisioning at least one virtual database (VDB) from the masked replica database.

9. The method of claim 1, wherein masking the one or more change logs using the predetermined masking algorithm to generate the one or more masked changes log comprises converting the one or more change logs to Java Database Connectivity (JDBC) statements.

10. The method of claim 1, wherein masking the one or more change logs using a the predetermined masking algorithm to generate one or more masked change logs comprises, for a change log of the one or more change logs:

identifying a primary key associated with the change log;

masking the primary key in accordance with the predetermined masking algorithm to generate a masked primary key; and using the masked primary key to identify data within the masked replica to be updated based on the change log.

11. A computer readable non-transitory storage medium, storing instructions that when executed by a computer processor cause the computer processor to perform steps comprising:

receiving one or more change logs, each corresponding to a respective update event made to data of the source database;

masking the one or more change logs using a predetermined masking algorithm to generate a set of masked change logs;

storing the set of masked change logs in a pre-buffer;

responsive to a determination that the set of masked change logs stored in the pre-buffer corresponds to a complete transaction:

determining whether any conflicts exist between any of the set of masked change logs stored in the pre-buffer and one or more masked change logs stored in a main buffer, wherein a conflict exists when a change log of the set of masked change logs and a change log of the one or more masked change logs stored in the main buffer are configured to operate on the same data of the masked replica database;

responsive to determining that a conflict exists between any of the set of masked change logs stored in the pre-buffer and the one or more masked change logs stored in the main buffer, applying the one or more masked change logs stored in the main buffer to the masked replica database to update the masked replica database, and flushing the main buffer;

moving the set of masked change logs corresponding to a complete transaction from the pre-buffer to the main buffer.

12. The computer readable non-transitory storage medium of claim 11, further storing instructions for applying the one or more masked change logs stored in the main buffer to the masked replica database and flushing the main buffer responsive to a determination that the main buffer is storing at least a threshold number of masked change logs.

13. The computer readable non-transitory storage medium of claim 11, wherein applying the one or more masked change logs stored in the main buffer to the masked replica database and flushing the main buffer comprises:

transmitting the one or more masked change logs from the main buffer to the masked replica database; and receiving a response from the masked replica database indicating whether the one or more masked change logs were successfully applied.

14. The computer readable non-transitory storage medium of claim 11, wherein the one or more change logs comprise changed data capture (CDC) data.

15. The computer readable non-transitory storage medium of claim 11, wherein each change log comprises a sequence number indicating a transaction that the change log is a part of, and further storing instructions for determining that the set of masked change logs stored in the pre-buffer corresponds to a complete transaction responsive to receiving a new change log having a different sequence number in comparison to the set of the masked change logs stored in the pre-buffer.

16. The computer readable non-transitory storage medium of claim 11, further storing instructions for determining that the set of masked change logs stored in pre-buffer corresponds to a complete transaction responsive to receiving a new change log explicitly indicating a transaction commit event.

17. The computer readable non-transitory storage medium of claim 11, wherein the one or more change logs each correspond to one of an update, an insert, or a delete.

18. The computer readable non-transitory storage medium of claim 11, further storing instructions for provisioning at least one virtual database (VDB) from the masked replica database.

19. The computer readable non-transitory storage medium of claim 11, wherein masking the one or more change logs using the predetermined masking algorithm to generate the one or more masked change logs comprises converting the one or more change logs to Java Database Connectivity (JDBC) statements.

20. The computer readable non-transitory storage medium of claim 11, wherein masking the one or more change logs using the predetermined masking algorithm to generate the one or more masked change logs comprises, for a change log of the one or more change logs:
   identifying a primary key associated with the change log;
   masking the primary key in accordance with the predetermined masking algorithm to generate a masked primary key;
   using the masked primary key to identify data within the masked replica to be updated based on the change log.

21. A computer system comprising:
   a computer processor; and
   non-transitory computer-readable storage medium storing instructions for executing by the computer processor, the instructions for:
      receiving one or more change logs, each corresponding to a respective update made to data of the source database;
      masking the one or more change logs using a predetermined masking algorithm to generate one or more a set of masked change logs;
      storing the one or more set of masked change logs in a pre-buffer configured to store a set of masked change logs;
      responsive to a determination that the set of masked change logs stored in the pre-buffer corresponds to a complete transaction:
         determining whether any conflicts exist between any of the set of masked change logs stored in the pre-buffer and one or more masked change logs stored in a main buffer, wherein a conflict exists when a change log of the set of masked change logs and a change log of the one or more masked change logs stored in the main buffer are configured to operate on the same data of the masked replica database;
         responsive to determining that a conflict exists between any of the set of masked change logs stored in the pre-buffer and the one or more masked change logs stored in the main buffer, applying the one or more masked change logs stored in the main buffer to the masked replica database to update the masked replica database, and flushing the main buffer;
      moving the set of masked change logs corresponding to a complete transaction from the pre-buffer to the main buffer.

* * * * *